United States Patent [19]

Beutel

[11] Patent Number: 4,616,837
[45] Date of Patent: Oct. 14, 1986

[54] SEAL RING WITH TIPPABLY SUPPORTED GUIDE RING

[75] Inventor: Achim Beutel, Weinheim, Fed. Rep. of Germany

[73] Assignee: H. Weissenfeld-Richters, Weinheim, Fed. Rep. of Germany

[21] Appl. No.: 808,006

[22] Filed: Dec. 11, 1985

[30] Foreign Application Priority Data

Jan. 17, 1985 [DE] Fed. Rep. of Germany ....... 3501334

[51] Int. Cl.$^4$ .............................................. F16J 15/32
[52] U.S. Cl. ................................... 277/153; 277/166; 277/182; 277/189; 277/198
[58] Field of Search ......... 277/152, 153, 165, DIG. 4, 277/198, 166, 179, 182, 189

[56] References Cited

U.S. PATENT DOCUMENTS

| | | | |
|---|---|---|---|
| 2,482,029 | 9/1949 | Reynolds | 277/152 |
| 3,393,536 | 7/1968 | Daur | 277/152 X |
| 4,195,854 | 4/1980 | Bertin | 277/153 |
| 4,240,643 | 12/1980 | Becker et al. | 277/165 X |
| 4,261,583 | 4/1981 | de Vries et al. | 277/189 X |
| 4,280,741 | 7/1981 | Stoll | 277/152 X |

FOREIGN PATENT DOCUMENTS 2743501 3/1979 Fed. Rep. of Germany ...... 277/153

Primary Examiner—Robert S. Ward
Attorney, Agent, or Firm—Felfe & Lynch

[57] ABSTRACT

A seal ring has a holding ring for fixedly mounting the seal ring on one machine part. An axially concentric guide ring is tippably supported on one side on a circumferentially-cylindric side of the holding ring. The other side of the guide ring guides the seal ring on another, relatively-movable machine part. A sealing ring having a sealing lip for sealing about the relatively-movable machine part is sealingly connected to the guide ring. A membrane-like annular projection of the sealing ring can be sealingly connected to the holding ring to seal and hold the holding and guide rings together.

16 Claims, 1 Drawing Figure

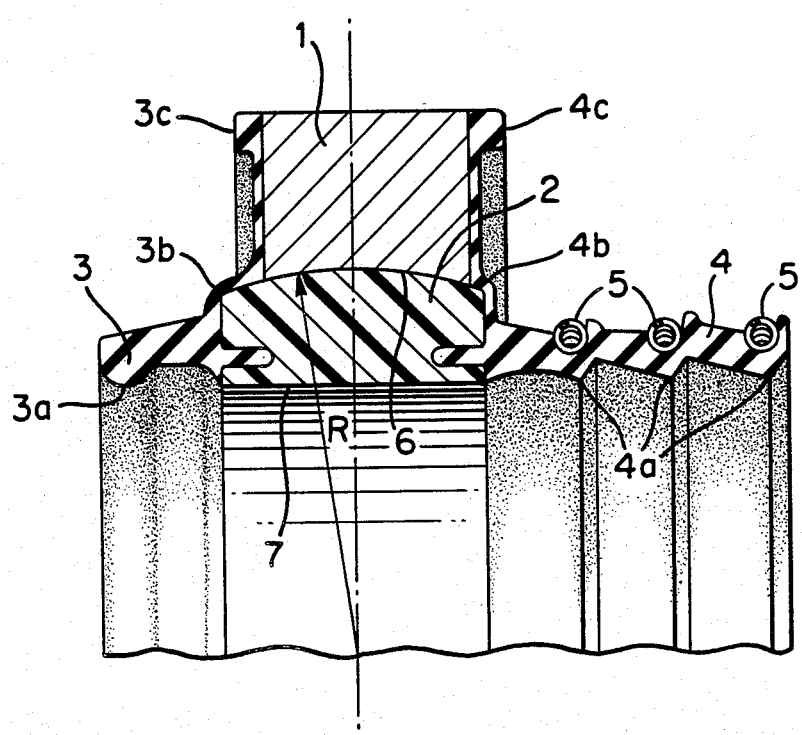

SEAL RING WITH TIPPABLY SUPPORTED GUIDE RING

BACKGROUND OF THE INVENTION

The invention relates to a seal ring for sealing about a relatively-reciprocating and/or relatively-rotating machine part.

A known seal ring has a holding ring for fixedly mounting the seal ring on one machine part. An axially concentric guide ring is supported on one side on the holding ring and has a guiding surface on the other side for guiding the seal ring on another, relatively-movable machine part. At least one sealing ring of resiliently-deformable material engages the guide ring and has at least one sealing lip for engaging the relatively-movable part and sealing thereabout.

U.S Pat. No. 4,205,595 describes such a seal. It is for a double-acting piston in a pneumatic cylinder. Accordingly, it has two sealing rings and lips projecting in axially-opposite directions. An externally-open groove extending around the holding ring mounts the guide ring for engaging the inside wall of the pneumatic cylinder with its outermost, guiding surface. This construction provides stable association of the two sealing lips with the inside wall of the cylinder even when axially-uniform transverse forces normal to their axis are introduced between the piston and cylinder.

Conditions in this regard change fundamentally, however, if a tipping moment is introduced into the seal ring as can happen, for example, if the piston rod experiences a bending stress during its stroke. Such conditions are found in many operating piston/cylinder units, caused, for example, by the weight of the piston/cylinder unit itself. They are usually rectified but, if not, they result in less than optimum sealing characteristics and can lead to premature failure of the seal on account of the circumferentially-varying association of the sealing lips with the cylinder wall.

SUMMARY OF THE INVENTION

The invention therefore has an object of improving a seal ring of the type described above such that even tipping moments do not change the association of its sealing lip with the relatively-moving machine part it engages.

To this and other ends, the invention provides a seal ring of the type first described above in which the sealing ring is sealingly connected to the guide ring liquid tight and the side of the guide ring supported by the holding ring is supported for tipping deflection relative to the axis of the seal ring. The relationship of the sealing ring and, especially, its sealing lip to the relatively-moving machine part which the sealing and guide rings will engage in use is, thus, always uniform in spite of any transverse forces, including tipping moments.

Axially-uniform, normal transverse forces introduced by the relatively-moving machine part are, as in the known designs, accommodated by having the guide ring held against the holding ring. They cannot, therefore, have a disadvantageous effect on the relative association of the sealing lip with the relatively-moving machine part, it being especially advantageous for this that the guide ring does not have to perform any kind of sealing function. It can therefore be made of a material that is characterized by a low coefficient of friction, minimal deformation, and good resistance to wear relative to the relatively-moving machine part it will engage.

Tipping moments are also kept away from the sealing lip of the sealing ring, however, by having the guide ring to which the sealing ring is connected tipably supported on the holding ring. Even considerable tipping stresses on the guide ring are, therefore, not transmitted to holding ring to change the relative association of the sealing lip with the relatively-moving machine part. The cross-sectional profile of the sealing lip can be, therefore, configured with the sole object of achieving optimum sealing results. Tandem sealing-lip arrangements as well as supplemental pressure devices such as garter springs, for example, can also be considered in contrast to the construction in the state of the art.

Any of the known sealing-ring materials can be used for the sealing ring, such as those on a basis of polytetrafluoroethylene, for example. However, elastomeric materials are preferred, because they are available at low cost and can be bonded to the guide ring easily, by vulcanization, for example.

The seal ring is suitable for all applications in which one machine part surrounds another axially of relative reciprocating and/or rotary movement therebetween. Depending on the application, the guide ring bearing the sealing ring is disposed on the inside or outside of the holding ring. Therefore, in addition to sealing a piston or plunger in a cylinder as described in U.S. Pat. No. 4,205,595, the seal ring can also be used to seal a machine part about a rotating axle or reciprocating shaft.

For making the guide ring tippable on the holding ring, the side of the holding ring against which the guide ring is held is advantageously circumferentially cylindric, i.e. arcuate in axial cross section. Axially-uniform, normal transverse forces then do not displace the guide and sealing rings relative to the axial center of the holding ring and, thus, the seal ring.

The surface of the guide ring held against the circumferentially-cylindric side of the holding ring is preferably complementary to conform to it. This provides especially good ability to perform the tipping movements.

A low pressure between the held-together surfaces of the guide and holding rings is an important consideration, especially if the material of the guide ring is less deformable material than that of the holding ring. For this, it has proven advantageous for the guide ring and the holding ring to engage one another over as large an area as possible. This can be accomplished easily by prolonging the complementarily-curved side of the guide ring which is held against the holding ring beyond the axial limits of the circumferentially-cylindric side of the holding ring, i.e. the guide ring is axially wider than the holding ring, the prolongation being such that, even if the maximum tipping moment is introduced, the guide ring will remain in full-surface engagement with the holding ring.

In many applications, an adequate seal is produced between the guide and holding rings simply by their engagement between the machine parts. In other applications, however, another secondary seal between the guide and holding rings is required. For this, at least one, membrane-like annular projection of the sealing ring from its liquid-tight connection to the guide ring to the holding ring has been found desirable for liquid-tight sealing engagement with the holding ring. The annular projection can also be affixed to the holding ring, for example by vulcanization, to assure an absolutely tight seal.

However, the membrane-like annular projection must not appreciably affect the relative movement between the guide ring and the holding ring. This can be easily assured by using appropriate dimensions, e.g. affixing the annular projection to the holding ring far enough from the guide ring relative to the flexibility of the annular projection.

DESCRIPTION OF THE DRAWING AND A PREFERRED EMBODIMENT

The drawing shows half a cross section of a merely-preferred seal ring according to the invention without limiting the invention thereto.

The preferred seal ring shown in the drawing is intended for sealing about a piston rod (not shown) and, for this, has a holding ring 1 around the outside of a guide ring 2.

The internal circumference of holding ring is a concave, cylindric surface 6, the center cylindric curvature of the cylindric surface being at the center of the guide ring as shown by the radius R. The outside of the guide ring 2 curves complementarily to the surface 6 but is prolonged axially beyond both sides of the holding ring 1 so as always to have the greatest possible contact area with the holding ring 1 even when tipped relative to the holding ring.

The holding ring 1 is steel; the guide ring 2 is polytetrafluoroethylene. Relative displacement of these two rings therefore does not have to overcome sticking friction. Instead, the guide ring can follow directly any tipping moment introduced by the relatively-moving, piston-rod machine part which, after the installation of the seal ring, engages an innermost guiding surface 7 of the guide ring 2. Therefore, the so-called stick-slip effect which, with other combinations of materials, can rapidly destroy one of the two components through friction cannot occur in this case. Special lubrication is therefore unnecessary.

An annular dirt-lip ring 3 of rubber-elastic material is vulcanized onto one, left side of the guide ring 2. After installation of the seal ring, it engages the surface of the relatively-moving, piston-rod machine part with a rounded, annular bead 3a on the inside thereof.

An annular sealing ring 4 of rubber-elastic material is vulcanized onto the other, right side of the guide ring 2. After installation of the seal ring, it enages the surface of the relatively-moving, piston-rod machine part with the points of each of three, angular, annular sealing lips 4a on the inside thereof. An annular, garter, spiral spring 5 surrounds the outside of the sealing ring 4 generally opposite each sealing lip 4a thereof to help hold the sealing lips against the relatively-moving, piston-rod machine part after installation thereabout.

The pressure of the bead and sealing lips against the surface of the relatively-moving, piston-rod machine part is uniform all around the bead and sealing lips, even if a tipping moment is introduced therebetween. This makes it possible to configure the bead and sealing lips and establish their pressure against the surface of the relatively-moving, piston-rod machine part without the compromises to optimum effectiveness formerly required. Both the sealing effect and the useful life of the seal ring can thus be substantially improved. It also makes possible use of supplemental pressure devices about the sealing ring like the annular, garter, spiral springs 5, for example.

Both the dust-lip ring 3 and the sealing ring 4 are also connected to the holding ring 1 by respective, integral, membrane-like annular projections 3b, 4b of the rings. Connecting the annular projections of the dust-lip and sealing rings to the holding ring sealingly but tippably holds the guide ring which is connected to each of them against the holding ring. For this, each of the annular projections has an outermost, axially-thickened bead 3c, 4c at least near the outer circumference of the holding ring 1. The beads 3c, 4c form static seals with the adjoining, relatively-nonmoving machine part (not shown). In addition, they provide the only connection of the annular projections 3b, 4b to the holding ring 1, by vulcanization thereto, for example. This spaces the connection of the dust-lip and sealing rings to the holding ring far enough from the guide ring to facilitate tipping of the guide ring.

For the same reason, there is also no permanent bond between either annular projection and the guide ring 2 but, instead, only more or less loose contact therebetween. In combination with their thin, membrane-like thickness, therefore, the annular projections are incapable of offering any appreciable resistance to tipping the guide ring 2 relative to the axis of the holding ring 1. Nevertheless, they prevent penetration of sealed medium or dust between the holding and guide rings. The annular projections thus also prevent any undesired leakage.

It will be understood that the specification and examples are illustrative but not limitative of present invention and that other embodiments within the spirit and scope of the invention will suggest themselves to those skilled in the art.

What is claimed is:

1. A seal ring, comprising:
a holding ring for fixedly mounting the seal ring on one machine part;
a guide ring axially concentric with the holding ring and tippably supported on one side of the holding ring, the other side of the guide ring being for guiding the seal ring on another, relatively-movable machine part; and
a resiliently-deformable sealing ring sealingly connected to the guide ring and having a sealing lip for sealing about the relatively-movable machine part.

2. The seal ring of claim 1, wherein the side of the holding ring tippably supporting the guide ring is circumferentially cylindric for the tippable support of the guide ring.

3. The seal ring of claim 2, wherein the center of the cylindric curvature of the circumferentially cylindric side of the holding ring is at the center of the guide ring.

4. The seal ring of claim 2, wherein the side of the guide ring tippably supported on the circumferentially cylindric side of the holding ring is complementarily circumferentially cylindric.

5. The seal ring of claim 3, wherein the side of the guide ring tippably supported on the circumferentially cylindric side of the holding ring is complementarily circumferentially cylindric.

6. The seal ring of claim 1, and further comprising means for sealing between the holding and guide rings.

7. The seal ring of claim 1, and further comprising a membrane-like, annular projection of the sealing ring for sealingly engaging the holding ring.

8. The seal ring of claim 2, and further comprising a membrane-like, annular projection of the sealing ring for sealingly engaging the holding ring.

9. The seal ring of claim 3, and further comprising a membrane-like, annular projection of the sealing ring for sealingly engaging the holding ring.

10. The seal ring of claim 4, and further comprising a membrane-like, annular projection of the sealing ring for sealingly engaging the holding ring.

11. The seal ring of claim 5, and further comprising a membrane-like, annular projection of the sealing ring for sealingly engaging the holding ring.

12. The seal ring of claim 7, wherein the annular projection is connected to the holding ring.

13. The seal ring of claim 8, wherein the annular projection is connected to the holding ring.

14. The seal ring of claim 9, wherein the annular projection is connected to the holding ring.

15. The seal ring of claim 10, wherein the annular projection is connected to the holding ring.

16. The seal ring of claim 11, wherein the annular projection is connected to the holding ring.

* * * * *

UNITED STATES PATENT AND TRADEMARK OFFICE
CERTIFICATE OF CORRECTION

PATENT NO. : 4,616,837

DATED : October 14, 1986

INVENTOR(S) : Achim Beutel

It is certified that error appears in the above-identified patent and that said Letters Patent is hereby corrected as shown below:

On the Title Page:
Item [73], "H. Weissenfeld-Richters" should be

--Firma Carl Freudenberg--.

Signed and Sealed this

Sixth Day of October, 1987

Attest:

DONALD J. QUIGG

Attesting Officer

Commissioner of Patents and Trademarks